United States Patent [19]

Hadley

[11] Patent Number: 4,875,421

[45] Date of Patent: Oct. 24, 1989

[54] SEEDING IMPLEMENT WITH A COMBINATION TRANSPORT-DRIVE WHEEL

[75] Inventor: Howard C. Hadley, Des Moines, Iowa

[73] Assignee: Deere & Company, Moline, Ill.

[21] Appl. No.: 172,825

[22] Filed: Mar. 25, 1988

[51] Int. Cl.$^4$ .............................................. A01C 19/04
[52] U.S. Cl. .................................... 111/200; 111/921; 172/669
[58] Field of Search ............ 111/52, 85, 60, 61, 111/62, 63, 66, 67; 172/310, 669, 763, 776; 180/53.6; 280/6 R

[56] References Cited

U.S. PATENT DOCUMENTS

| | | | |
|---|---|---|---|
| 1,063,907 | 6/1913 | Biggerstaff | 111/52 |
| 2,525,047 | 10/1950 | Sawtelle et al. | 172/310 |
| 3,177,829 | 4/1965 | Hansen | 111/52 |
| 3,200,778 | 8/1965 | Whelchel | 111/85 |
| 3,742,877 | 7/1973 | Coffee | 111/85 |
| 4,265,186 | 5/1981 | Nichols | 111/52 |
| 4,721,048 | 1/1988 | Fuss et al. | 111/85 |
| 4,762,181 | 8/1988 | Cox | 111/52 |

FOREIGN PATENT DOCUMENTS 555874  7/1923  France ................... 111/52

*Primary Examiner*—Danton D. DeMille

[57] ABSTRACT

A seeding implement such as a minimum tillage drill including a pair of trailing transport wheels located inwardly of the outermost ends of the implement frame, one of the wheels being a combination transport-drive wheel mounted on a pivoting wheel frame with a portion of the implement frame extending rearwardly over the wheel frame to act as a stop member for maintaining the trailing wheels in a generally level condition during transport but permitting the combination transport-drive wheel to rock downwardly and stay in ground contact when the openers lift the machine on uneven terrain or in hard ground conditions.

13 Claims, 2 Drawing Sheets

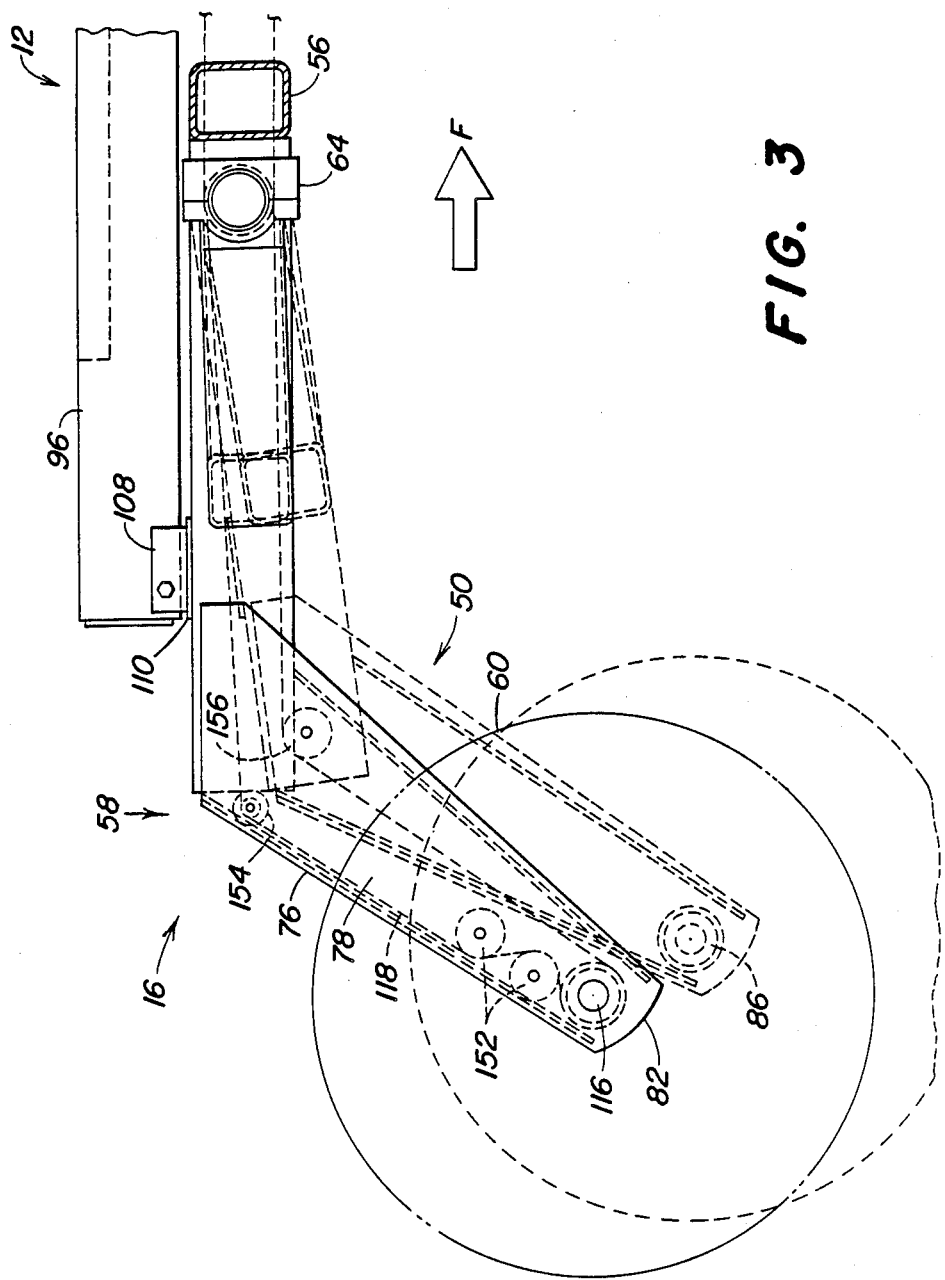

SEEDING IMPLEMENT WITH A COMBINATION TRANSPORT-DRIVE WHEEL

BACKGROUND OF THE INVENTION

The present invention relates generally to agricultural implements and more specifically to a seeding implement having a frame supported by ground-engaging wheels and a material metering system driven by a ground-engaging wheel.

Seeding implements such as end-wheel drills are typically supported by a pair of ground-engaging wheels connected near the outer ends of a transversely extending frame. A plurality of ground-engaging tools are supported between the wheels for opening furrows in the ground and depositing granular material from a frame-mounted hopper through a metering system which is driven by a ground-engaging wheel. A lift mechanism is provided for raising and lowering the tools between field-working and transport positions. In some ground conditions, particularly in minimum tillage operations, the upward forces transmitted from the tools to the frame can actually lift the meter drive wheel causing skips in planting.

Many implements utilize an extra drive wheel to operate the metering device on the implement. This extra wheel adds to the expense of the implement and often requires a down-pressure spring to help maintain the wheel in good driving relationship with the soil. The additional wheel structure adds cost, weight and complexity to the implement. In addition, the meter drive wheel is often supported near the forward end of the implement by a forwardly extending arm which pushes rather than pulls the wheel and subjects the wheel structure to high stresses and wear.

In a seeding implement, such as a typical end-wheel drill wherein the wheels are mounted at the outermost ends of the frame, the increased width as a result of the outwardly mounted wheels can be detrimental to transport, especially over narrow roads and bridges and through narrow gates and the like. The end wheels also prevent planting of seeds close to the field edge.

SUMMARY OF THE INVENTION

It is therefore an object of the present invention to provide an improved seeding implement. It is a further object to provide such an implement which does not have the disadvantage as set forth above and which is particularly useful in minimum tillage operations.

It is another object of the present invention to provide a seeding implement having an improved transport and drive wheel structure. It is a further object to provide such an implement with a transport and drive wheel arrangement which is simpler, sturdier and more reliable and yet less expensive than at least many previously available wheel arranagements.

It is yet another object of the present invention to provide a seeding implement with a combination transport-drive wheel structure which eliminates the need for an extra drive wheel and the structure associated with an extra drive wheel. It is still another object to provide such a structure which is less expensive, more reliable and which is less subject to slipping than most previously available wheel structures on a seeding implement, even in minimum tillage operations.

It is a further object of the present invention to provide a seeding implement with combination transport-drive wheel structure wherein the drive wheel is pulled rather than pushed so that scrubbing forces on turns are reduced. It is still another object to provide such a structure which is narrower than and has improved transport characteristics over previously available structures.

A seeding implement constructed in accordance with the teachings of the present invention includes a transversely extending frame having outermost ends and fore-and-aft frame members spaced inwardly from the ends. A trailing ground-engaging support wheel is connected to one of the fore-and-aft extending frame members, and a combination support and meter drive wheel is mounted on a rockable wheel frame assembly located below the aft end of the other frame member so that the assembly is rockable from an uppermost position wherein the meter drive wheel is generally aligned with the support wheel for level transport of the implement. The drive wheel can follow ground contours and remain in ground contact when the seeding tools lift the frame as the implement operates over irregular ground surfaces or in hard ground conditions. The rockable trailing wheel frame assembly includes a drive system for transferring drive from the ground-engaging wheel to a drive shaft which rotates about the pivotal axis of the wheel frame. The drive shaft is connected to the metering structure on the implement.

The wheels are located inwardly of the outermost ends of the frame for providing narrow transport width. The wheel frame assembly stops against the frame member and includes a diagonal brace to provide sturdy, reliable transport support for the implement, even with a hopper full of material.

These and other objects, features and advantages of the present invention will become apparent to those skilled in the art from the description which follows and from the drawings.

BRIEF DESCRIPTION OF THE DRAWINGS

FIG. 3 is a side view of the wheel support frame of FIG. 2.

DESCRIPTION OF THE PREFERRED EMBODIMENT

Figure 1:
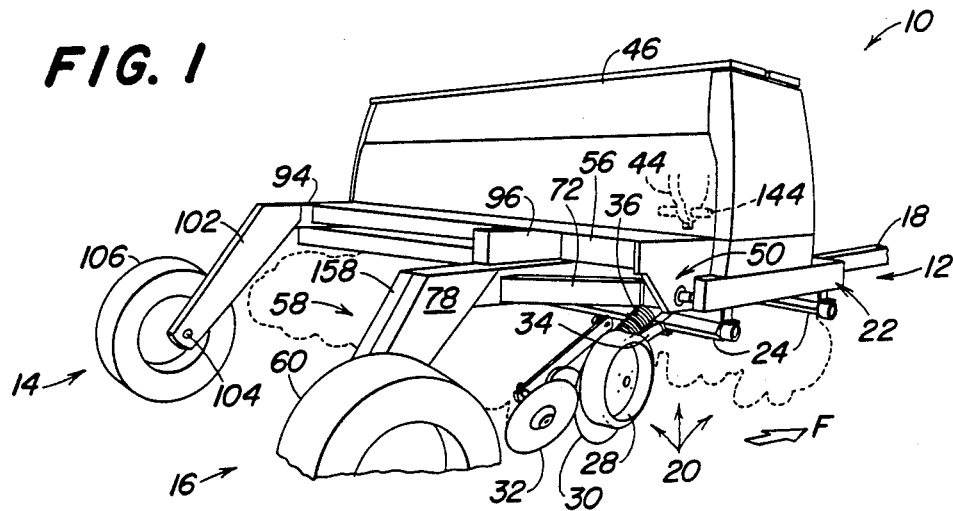
FIG. 1 is a perspective view of a seeding implement with the wheel support arrangement of the present invention attached thereto.

Referring to FIG. 1, there is shown a seeding implement 10 having a main frame 12 supported by ground wheel assemblies 14 and 16. A front hitch structure 18 is connected to the frame 12 and is adapted for attachment to a vehicle such as a tractor (not shown) for towing the implement 10 in the forward direction (F). The frame 12 includes transversely outermost frame ends 22 and supports rockable toolbars 24 between the frame ends 22. The tool assemblies 20 are fixed to the toolbars 24 and are rockable therewith between raised transport positions and lowered ground-engaging positions. The tool assemblies 20 are generally uniformly spaced substantially the entire width of the implement between the frame ends 22. As shown, the tool assemblies 20 are minimum tillage opener assemblies including a gauge wheel 28, an angled disk opener 30 and a press wheel 32 supported on an arm 34 connected to the toolbar 24 and biased downwardly by a spring 36. A seed boot assembly (not shown) located closely adjacent the disk opener 30 is connected to a hose extending from a material metering device such as a seed meter 44 carried at the lower portion of a transversely extending hopper 46 located on the frame 12. A meter drive assembly 50 is located on the ground wheel assembly 16 and is drivingly connected to the seed meters 44 for supplying seed or other granular material to the tool assemblies 20 at a rate proportional to the ground speed of the implement 10.

The entire weight of the implement 10 including the weight of the material within the hopper 46 is carried by the ground wheel assemblies 14 and 16 and by the front hitch structure 18. When the tool assemblies 20 are lowered to the ground-engaging position, the upward force exerted by the assemblies 20 on the frame 12 can actually lift the frame in certain ground conditions so that the wheel assemblies 14 and 16 carry little or no weight. When the implement 10 is operated over irregular ground surfaces, the weight of the implement can also be removed from the wheels 14 and 16. To assure skipless, even metering by the ground wheel assembly 16 through the meter drive assembly 50, the ground wheel assembly 16 is pivotally connected to rear transverse beam 56 of the frame 12 by pivot structure indicated generally at 54.

The ground wheel assembly 16 includes a vertically rockable wheel frame 58 supporting a ground-engaging drive wheel 60 for rotation about a generally horizontal axis which extends perpendicular to the forward direction (F) of travel. The wheel frame 58 includes a forward, transverse tubular section 62, and the pivot structure 54 includes transversely spaced bearing structures 64 and 66 which rotatably mount the tubular section 62 to the beam 56. A fore-and-aft extending beam 68 is fixed at its forward end to one end of the tubular section 62 outwardly of bearing 64. A diagonal brace 72 is connected at its forward end to the tubular section 62 adjacent the bearing structure 66 and at its opposite end to the aft end of the beam 68. A downwardly and rearwardly projecting leg 76 is connected at its upper end to the aft end of the beam 68. The leg 76 includes a pair of fore-and-aft upright plates 78 which are connected to the side of the beam 68 and which widen in the fore-and-aft direction from lower ends 82 to their connections with the beam 68. An axle housing 84 is welded to the lower ends 82 of the side plates 78 and extends outwardly therefrom in the direction of the diagonal brace 72. An axle 86 is connected to the hub of the drive wheel 60 and extends outwardly from the opposite side plate 78 (FIG. 2).

As best seen in FIGS. 1 and 3, the main frame 12 includes fore-and-aft extending connecting beams 94 and 96 located inwardly adjacent the opposite frame ends 22 and projecting rearwardly beyond the rear beam 56. The aft end of the connecting beam 94 is rigidly connected to the ground wheel assembly 14 which includes a downwardly and rearwardly extending leg 102 fixed at its upper end to the aft end of the beam 94 and extending downwardly and rearwardly to a connection with an axle 104 which supports a ground wheel 106 for rotation about an axis parallel to the axis of rotation of the drive wheel 60. In the preferred embodiment, the wheels 60 and 106 are supported by their respective wheel support assemblies inwardly of the frame ends 22 to minimize the width of the implement 10.

The fore-and-aft beam 68 of the wheel frame 58 is located directly below the aft end of the beam 96 to limit the upward rocking of the wheel frame 58 to an uppermost position as shown in FIG. 1 wherein the wheel 60 is level with the wheel 106. An angle 108 (FIG. 3) is connected to the bottom of the beam 96 and contacts a plate 110 as the wheel frame 58 rocks to the uppermost position. The arrangement of the frame 12 with the beam 96 extending over the wheel frame 58 provides a sturdy support arrangement for the drive wheel 60 while permitting the drive wheel 60 to rock downwardly from the uppermost position over a range of lower positions to stay in ground contact when the tool assemblies 20 are in their field-working positions. The construction of the wheel frame 58 not only provides good vertical and lateral support of the drive wheel 60, but it is also sufficiently heavy to maintain the drive wheel 60 in good driving relationship with the soil during field-working operations without the need for additional down pressure springs or the like.

Figure 2:
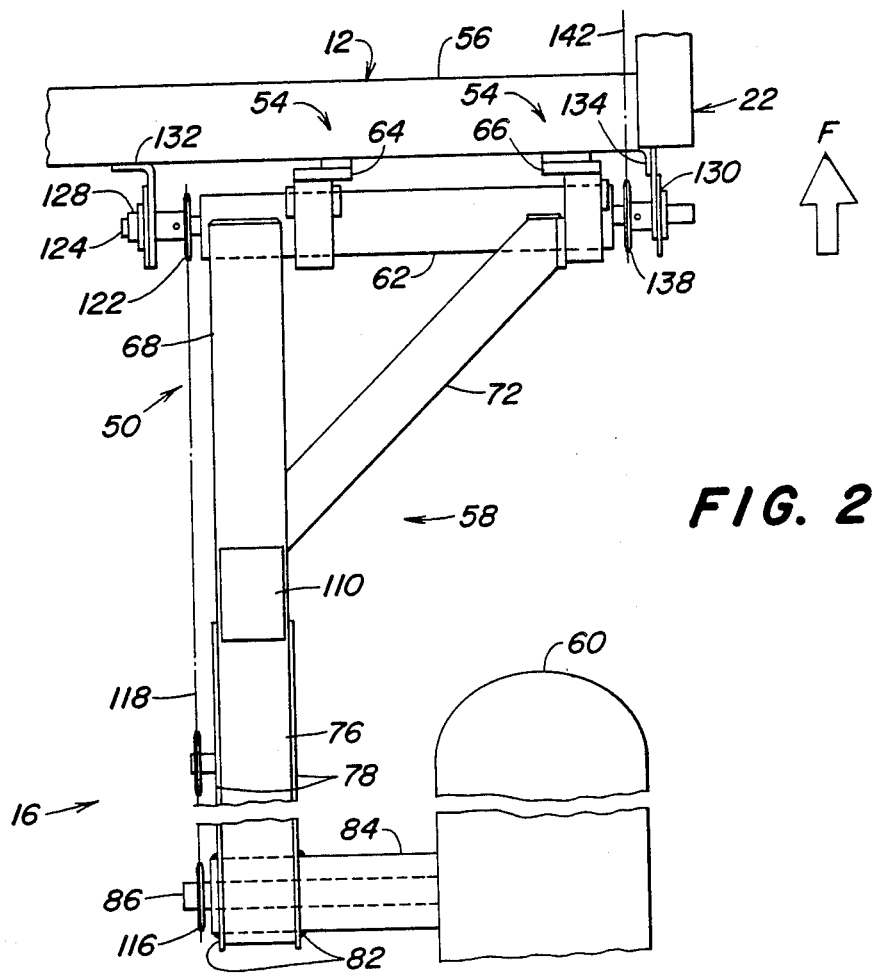
FIG. 2 is a top view of the rockable wheel frame of the arrangement of FIG. 1.

As best seen in FIGS. 2 and 3, the meter drive assembly 50 includes a sprocket 116 fixed for rotation with the axle 86 and connected by a drive chain 118 or similar endless belt-type drive to a sprocket 122 fixed to a transversely extending shaft 124 which extends through the tubular section 62 and is supported from the beam 56 by bearings 128 and 130 located on brackets 132 and 134, respectively. A sprocket 138 is connected to the shaft 124 adjacent the bracket 134 and is connected by a chain 142 to a corresponding sprocket (not shown) on a conventional drive shaft 144 or transmission connected to the seed meters 44.

The drive chain 118 is trained around the sprocket 116, and the upper run of the chain is routed through an idler arrangement 152 (FIG. 3) and extends upwardly therefrom generally parallel to the back edge of the leg 76 to a roller 154. From the roller 154 the chain 118 extends generally horizontally to the sprocket 122. The chain extends around the sprocket 122 and rearwardly over a second roller 156 and then downwardly to the sprocket 116. As best seen in FIG. 3, the meter drive assembly 50 is contained within a space generally defined by the profile of the wheel frame 58. A cover 158 conforming generally to the profile of the wheel frame 58 is secured to the side of the frame to house and shield the meter drive assembly 50.

In operation, a tractor is connected to the front hitch structure 18 and, with the tool assemblies 20 rocked upwardly by their respective toolbars 24 to a transport position, the implement 10 is towed to the field with the wheel assemblies 14 and 16 and the hitch 18 supporting the weight of the implement. The ground wheel assembly 16 remains in its uppermost position with the angle 108 in contact with the plate 110. When the implement 10 is positioned in the field for planting, the toolbars 24 are rotated by actuating a hydraulic cylinder (not shown) operably connected to the toolbars. The tool assemblies 20 rotate downwardly into ground contact, and the down pressure springs 36 bias the assemblies 20 against the soil. As the implement is towed forwardly over the field, the wheel 60 drives the assembly 50 which in turn rotates the metering devices in the seed meters 44. Seed is metered to the furrows opened by the disk openers 30 at a rate proportional to the ground speed. The weight of the wheel frame 58 biases the drive wheel 60 into ground contact. As upward forces are exerted on the tool assemblies 20 which tend to lift the frame 12 and remove the weight of the frame 12 from the wheel frame 58, the frame 58 can pivot downwardly about the axis of the drive shaft 24 to maintain meter drive consistency and prevent skips in planting even as the implement 10 is towed over hard or uneven ground. At the end of the field, the toolbars 24 are rotated to lift the tool assemblies 20 from the ground contact position so that the entire weight of the implement, including the weight of the material in the hopper 46, is carried on the wheel assemblies 14 and 16 and the hitch structure 18.

Having described the preferred embodiment, it will be apparent that modifications can be made without departing from the scope of the invention as defined in the accompanying claims.

I claim:

1. A seeding implement adapted to be towed forwardly over the ground, comprising:
    a main frame extending transversely to the forward direction and having outermost ends;
    a material hopper supported by the main frame;
    first and second trailing ground-engaging wheels;
    means for supporting the main frame on the wheels, including means for connecting the wheels to the main frame in trailing relationship to the main frame inwardly of the outermost ends;
    tool assemblies connected to the main frame and movable with respect thereto between downwardly biased ground-engaging positions and upper transport positions;
    drivable metering structure for metering material from the hopper to the tool assemblies;
    meter drive structure operably connecting the metering structure and the first ground-engaging wheel for driving the metering structure at a rate proportional to the forward speed of the implement;
    wherein said means for connecting the wheels to the main frame includes means for fixedly supporting the second wheel at a preselected vertical location relative to the main frame, a fore-and-aft extending wheel frame, means pivotally connecting the forward end of the wheel frame to the main frame for free rocking of the wheel frame relative to the main frame and the second wheel about a first axis extending transversely to the forward direction, means rotatably supporting the first wheel from the aft end of the wheel frame, said wheel frame freely rockable about the first axis from an uppermost transport position to a range of field-working positions below the transport position to maintain contact between the first wheel and the ground at all times when the tool assemblies are in the ground-engaging position to thereby provide consistent drive from the first wheel to the metering structure.

2. The invention as set forth in claim 1 wherein the meter drive structure includes endless drive means connected to the wheel frame for rocking with the first wheel.

3. The invention as set forth in claim 2 wherein the wheel frame includes a tubular member pivotally connected to the main frame for rocking about an axis transverse to the forward direction, and the drive structure includes a shaft mounted for rotation about the axis within the tubular member, and drive pulley means fixed to the shaft, said endless drive means trained around the drive pulley means.

4. The invention as set forth in claim 3 wherein the wheel frame has a preselected profile, and means for supporting the endless drive means alongside and generally within the profile of the wheel frame.

5. The invention as set forth in claim 4 including cover means connected to and extending outwardly from the wheel frame for shielding the meter drive structure.

6. The invention as set forth in claim 1 wherein the wheel frame includes an arm member pivotally connected at its forward end to the main frame for rocking about a transverse axis, and the main frame includes a fore-and-aft extending beam extending over the transverse axis above the arm member and contacting the arm member when the wheel frame is in the uppermost position to prevent upward rocking of the wheel frame above the uppermost position.

7. The invention as set forth in claim 6 wherein the main frame includes a second fore-and-aft extending beam offset laterally from the first-mentioned beam, and wherein the means for supporting the second wheel includes a support arm fixed to the second beam and extending downwardly and rearwardly therefrom.

8. The invention as set forth in claim 1 including forward hitch structure adapted for connection to a towing vehicle, and wherein when the tool assemblies are in the transport positions, substantially the entire weight of the implement is carried by the first and second wheels and the hitch structure.

9. A seeding implement comprising:
    a transversely extending frame having outermost ends;
    a material hopper supported by the frame;
    a plurality of ground-engaging tool assemblies supported by the frame between the frame ends for movement between lowered ground-engaging positions and upper transport positions;
    metering structure for metering material from the hopper toward the tool assemblies;
    means for supporting the frame for forward movement over the soil including first and second ground-engaging wheels, means for supporting the wheels from the frame rearwardly of the tool assemblies and inwardly of the frame ends, said means for supporting including a first fore-and-aft extending arm member having a forward end and an aft end supporting the first wheel for rotation about a wheel axis extending transverse to the forward direction, means pivotally connecting the forward end of the arm member to the main frame for free rocking vertically of the arm member about an arm axis generally parallel to the wheel axis between an uppermost transport position wherein the first wheel supports the frame and lower field-working positions to maintain contact between the first wheel and the ground at all times when the tool assemblies are in the ground-engaging positions, a second fore-and-aft extending arm member transversely offset from the first arm member and supporting a second wheel for rotation about an axis, said second arm member being fixed to the frame, and stop means for preventing upward rocking of the first arm member about the arm axis beyond the transport position, wherein in the transport position the first wheel is at approximately the same vertical relationship with respect to the frame as the second wheel, and the first and second wheels support the weight of the frame when the tool assemblies are in the upper transport positions and the first wheel is in the transport position; and a meter drive assembly connected between the first wheel and the metering structure for driving the metering structure at a rate proportional to the forward speed of the implement, said meter drive assembly including endless drive means supported alongside the first arm member, and pulley means supported from the frame for rotation about an axis corresponding to the pivotal axis of the first arm member, wherein said endless drive means is trained around the pulley means.

10. The invention as set forth in claim 9 wherein the frame includes a fore-and-aft extending beam having a rearward extension located over the first arm member and wherein the stop means includes means located on the rearward extension for contacting the first arm member as the first arm member rocks upwardly to the transport position.

11. The invention as set forth in claim 10 including a transversely extending tubular member pivotally connected to the aft end of the main frame, wherein the first arm member is fixed to the tubular member at one end thereof, and diagonal brace means extending from the opposite end of the tubular member to the aft end of the first arm member.

12. The invention as set forth in claim 11 wherein the meter drive structure includes a drive shaft extending through the tubular member.

13. The invention as set forth in claim 10 wherein the stop means extends rearwardly of the arm axis a preselected distance, said preselected distance being at least approximately half the distance from the arm axis to the wheel axis.

* * * * *